(12) United States Patent
Nolfo et al.

(10) Patent No.: US 6,783,737 B2
(45) Date of Patent: Aug. 31, 2004

(54) HIGH PRESSURE CHEMISTRY REACTOR

(75) Inventors: Joseph Nolfo, Hawthorne, NJ (US); Maxine Soumellant, Hamilton Square, NJ (US); Victor W. Rosso, East Windsor, NJ (US); Peter Lee, East Windsor, NJ (US); Mayra B. Reyes, Monmouth Junction, NJ (US); John J. Venit, North Brunswick, NJ (US)

(73) Assignee: Bristol-Myers Squibb Company, Princeton, NJ (US)

( * ) Notice: Subject to any disclaimer, the term of this patent is extended or adjusted under 35 U.S.C. 154(b) by 0 days.

(21) Appl. No.: 10/057,459

(22) Filed: Jan. 25, 2002

(65) Prior Publication Data

US 2003/0143121 A1 Jul. 31, 2003

(51) Int. Cl.[7] ................................................ B01J 12/00
(52) U.S. Cl. ........................ 422/129; 130/99; 130/100; 130/102; 130/103
(58) Field of Search ........................ 422/103, 129–131, 422/100, 143, 99, 102, 104; 137/15.21, 625.18, 561

(56) References Cited

U.S. PATENT DOCUMENTS

| | | | | |
|---|---|---|---|---|
| 4,810,471 A | * | 3/1989 | Wachob et al. | 422/103 |
| 5,324,483 A | * | 6/1994 | Cody et al. | 422/131 |
| 5,342,581 A | * | 8/1994 | Sanadi | 422/101 |
| 5,472,672 A | * | 12/1995 | Brennan | 422/131 |
| 5,503,805 A | * | 4/1996 | Sugarman et al. | 422/131 |
| 5,660,792 A | * | 8/1997 | Koike | 422/63 |
| 5,716,584 A | * | 2/1998 | Baker et al. | 422/131 |
| 5,762,881 A | * | 6/1998 | Harness et al. | 422/132 |
| 5,765,591 A | * | 6/1998 | Wasson et al. | 137/597 |
| 5,792,431 A | * | 8/1998 | Moore et al. | 422/134 |
| 5,846,489 A | | 12/1998 | Bienhaus et al. | |
| 5,866,342 A | * | 2/1999 | Antonenko et al. | 435/7.1 |
| 5,874,048 A | * | 2/1999 | Seto et al. | 422/100 |
| 5,888,830 A | * | 3/1999 | Mohan et al. | 436/174 |
| 5,961,925 A | * | 10/1999 | Ruediger et al. | 422/99 |
| 5,976,470 A | * | 11/1999 | Maiefski et al. | 422/103 |
| 6,045,755 A | * | 4/2000 | Lebl et al. | 422/65 |
| 6,083,682 A | * | 7/2000 | Campbell et al. | 435/4 |
| 6,126,904 A | * | 10/2000 | Zuellig et al. | 422/130 |
| 6,132,686 A | * | 10/2000 | Gallup et al. | 422/130 |
| 6,159,368 A | * | 12/2000 | Moring et al. | 210/321.75 |
| 6,190,619 B1 | * | 2/2001 | Kilcoin et al. | 422/131 |
| 6,251,343 B1 | * | 6/2001 | Dubrow et al. | 422/102 |
| 6,306,658 B1 | | 10/2001 | Turner et al. | |
| 6,342,185 B1 | * | 1/2002 | Dahl et al. | 422/82.12 |
| 6,439,036 B1 | * | 8/2002 | Mansky | 73/61.41 |
| 6,485,692 B1 | | 11/2002 | Freitag et al. | |
| 6,576,196 B1 | * | 6/2003 | Akporiaye et al. | 422/82.12 |
| 6,627,160 B2 | * | 9/2003 | Wanner | 422/100 |
| 2003/0161763 A1 | | 8/2003 | Erden et al. | |

* cited by examiner

*Primary Examiner*—Jill Warden
*Assistant Examiner*—Elizabeth Quan
(74) *Attorney, Agent, or Firm*—Deanna L. Baxam

(57) ABSTRACT

Multiple parallel chemical reactions are performed under pressure in a reactor including a multi-row array of reaction vessels situated between a temperature control base and a fluid flow manifold. The manifold consists of an input portion connected to the fluid supply by a five-way valve and a distribution portion which includes separate parallel distribution channels, one for each row of reaction vessels. A control valve for each distribution channel is interposed between the manifold portions such that the fluid flow to each row of reaction vessels can be independently controlled. An explosion proof transparent shield can be situated between the base and manifold, surrounding the reaction vessels. The interior of the shield can be flooded with inert gas.

32 Claims, 8 Drawing Sheets

HIGH PRESSURE CHEMISTRY REACTOR

The present invention relates to reactors for performing multiple parallel chemical reactions under pressure and more particularly, to a high pressure chemistry reactor in which the flow of fluid to rows of reaction vessels can be independently controlled by valves interposed between the portions of a two-part manifold fed through a five-way fluid input valve. The reactor includes an explosion proof transparent shield which can be flooded with inert gas.

Drug development in the pharmaceutical industry has changed dramatically due to combinatorial chemistry techniques and automated high-throughput screening. Chemistry laboratories are in need of automated equipment that is capable of screening larger numbers of drug candidates quickly and efficiently. Hence, increasingly sophisticated reactor systems for performing multiple parallel chemistry reactions are being developed.

Such sophisticated equipment is needed for drug screening through the use of catalysts, solvents, reagents and the like, as well as testing for optimal reaction conditions. For example, the efficient screening of catalysts and certain solvents for hydrogenation reactions requires automated equipment capable of maintaining a high pressure environment in the vessels in which the reactions take place.

At one time, such screening was performed in a single pressurized vessel situated on a shaker platform. Only one catalyst or solvent at a time could be tested. To increase throughput in such pressurized catalyst and solvent screening, multiple vessel pressurized reactor systems have been developed. One such system is available from Argonaut Technologies, 887 Industrial Boulevard, San Carlos, Calif. 94070, under the tradename ENDEAVOR. The Argonaut apparatus consists of eight metal jackets or tubes situated in a line. A 15 ml. disposable glass vessel is received in each jacket. The reactions take place within the glass vessels. Each vessel has a separate gas input and is independently temperature and pressure controlled. The metal jackets serve as a safety feature to contain the explosion of an over-pressurized vessel.

While the Argonaut reactor is capable of running eight reactions at one time, the apparatus is quite complex and expensive as separate input, control and monitoring elements are required for each vessel. Thus, set up and run time is long. Moreover, because the reaction vessels are situated within metal tubes, the reactions cannot be observed.

Another example of a multi-vessel pressure reactor which avoids some of the problems of the Argonaut individual vessel gas input and pressure control is available from SmithKline Beecham Pharmaceuticals. That system is described in the paper entitled "Automated Catalyst Screening: An Important Tool To Speed-Up the Chemical Process Development In the Pharmaceutical Industry" by Hiebl et al. given Nov. 18–19, 1999 in Philadelphia, Pa. at the Combinatorial Catalysis & Catalyst Organization '99.

The Smithkline Beecham pressure reactor consists of a hollow aluminum cylinder with a stainless steel top plate which holds seven individual steel tubes. The pressure reactions are carried out in standard glass vials situated within the steel holding tubes. The aluminum block fits onto a standard Parr shaker. Accordingly, it increases the capacity of a standard Parr shaker by a factor of seven.

Although an individual gas supply is provided for each vessel, all of the vessels are maintained at the same pressure because they are fed from a common feedpipe. Reactions can be carried out at elevated temperatures by pumping a heated liquid through the aluminum block. The reactor can be used in a standard automated synthesis work station and in combination with on-line HPLC analysis equipment.

Another commercially available multiple vessel pressure reactor system in which the pressure in all reactor vessels is controlled simultaneously from a common source is available from Charybdis Technologies, Inc. of 5925 Priestly Drive, Carlsbad, Calif. 92008. Called the Calypso Multi-Temp Reaction Block System, it is constructed of all-glass reaction wells assembled within a PTFE Teflon® shell, which is resistant to corrosive reagents and organic solvents. The internal cavity of the reactor can be filled with circulating fluid for temperature control. The reactor frame is made of anodized aluminum. It is available in 6, 12, 24, 48 and 96 well formats.

There are the clear advantages of increased throughput and decreased complexity in systems such as those from the SmithKline Beecham and Charybdis Technologies described above, where all reaction vessels are simultaneously pressurized from a common gas input, as compared to the Argonaut system, where each vessel is independently pressurized. However, those systems also have their drawbacks. Cross-contamination of the reaction vessels is a problem because of the common input feed. Loss of all of the reactions will result, should one of the glass vessels rupture. Those systems are also prone to increased flammability, creating a safety hazard. In addition, those reactors lack versatility because it is not possible to pressurize only selected ones of the vessels. In situations where only a limited number of reactions can be performed because of cost considerations, such as due to the use of highly expensive catalysts, this may be a great drawback.

Another disadvantage of those pressure reactors is that fluid introduction and evacuation is complicated, particularly when multiple step purging operations are performed. For example, if vacuum, hydrogen introduction, evacuation and nitrogen introduction steps are required in sequence, or if degassing by several sets of alternating nitrogen introduction and evacuation steps are required, the fluid connections to the reactor must be changed between each step. This is time consuming and labor intensive.

Other problems with commercial reactors of this type relate to the sealing of the glass reaction vessels and the inability to relieve excess pressure build-up which can lead to explosion. Moreover, accurate temperature control is often difficult to achieve.

It is, therefore, a prime object of the present invention to provide a high pressure chemistry reactor with rows of isolated and independently controlled reaction vessels.

It is another object of the present invention to provide a high pressure chemistry reactor in which pressurization of selected rows of reaction vessels is possible.

It is another object of the present invention to provide a high pressure chemistry reactor including a multiple-way input valve capable of connecting the reaction vessels to multiple introduction and evacuation sources without changing the connections.

It is another object of the present invention to provide a high pressure chemistry reactor having improved reaction vessel sealing means.

It is another object of the present invention to provide a tool for use with a high pressure chemistry reactor which facilitates mounting of the reaction vessel sealing means.

It is another object of the present invention to provide a high pressure chemistry reactor with excess pressure relief means.

It is another object of the present invention to provide a high pressure chemistry reactor with increased temperature control accuracy.

It is another object of the present invention to provide a high pressure chemistry reactor including an explosion proof shield surrounding the reaction vessels that is capable of maintaining an inert atmosphere.

In accordance with one aspect of the present invention, apparatus for performing parallel chemical reactions under pressure in a plurality of reaction vessels is provided. The apparatus includes a base with first and second sets of reaction vessel receiving recesses into which reaction vessels are received. At least one of the recess sets has more than one recess. Fluid supply means and fluid manifold means are provided. Means are provided for operably connecting the fluid supply means and the fluid manifold means. The manifold means includes first and second valve means independently operably connecting the fluid supply means to each of the reaction vessels received in each of the first and second sets of reaction vessel receiving recesses, respectively.

The base includes a third set of reaction vessel receiving recesses into which reaction vessels are received. The fluid manifold means has third valve means independently operably connecting the fluid supply means to each of the reaction vessels received in the third set of reaction vessel receiving recesses.

The base includes a fourth set of reaction vessel receiving recesses into which reaction vessels are received. The fluid manifold has fourth valve means independently operably connecting the fluid supply means with each of the reaction vessels received in the fourth set of reaction vessel receiving recesses.

The vessels received in first and second sets of reaction vessel receiving recesses include first and second rows of reaction vessels, respectively. The vessels received in the third set of reaction vessel receiving recesses include a third row of reaction vessels. The reaction vessels received in the fourth set of reaction vessel receiving recesses include a fourth row of reaction vessels.

The fluid supply means includes multiple fluid sources. The connecting means includes a multiple-way fluid input valve. The multiple-way input valve preferably takes the form of a five-way valve.

The manifold means includes means for separately sealing each of the reaction vessels. The sealing means consists of an o-ring and means for affixing the o-ring to the manifold.

The manifold means further comprises a pressure relief valve. This valve provides the important safety feature of relieving excess pressure from the manifold means.

An explosion proof shield may be interposed between the base and the manifold means. It defines an interior space within which the reaction vessels are situated. Means are provided for connecting the interior space of the shield and an inert gas supply.

The manifold means includes a first manifold portion and a second manifold portion. The fluid supply connecting means is connected to the first manifold portion. The first and second valve means include first and second valve bodies which are interposed between the first and second manifold portions.

The first and second valve means have first and second valve stems. The first and second valve stems have different heights so as not to interfere with each other.

Temperature sensing means are provided. One of the reaction vessels received in one of the first and second sets of reaction vessel recesses is adapted to receive the temperature sensing means.

In accordance with another aspect of the present invention, apparatus is provided for performing parallel chemical reactions under pressure in a plurality of reaction vessels. The apparatus includes a base with an array of reaction vessel receiving recesses into which reaction vessels are adapted to be received. Fluid supply means are connected to manifold means. The manifold means includes an input manifold and a distribution manifold. Valve means are interposed between the manifolds. Means operably connect the fluid supply means and the input manifold such that fluid from the supply means passes through the input manifold, the valve means and the distribution manifold, to the reaction vessels.

The reaction vessels received in the vessel receiving recesses are divided into two sets. The valve means includes first and second valves operably connected to the reaction vessels in the first and the second sets, respectively. The distribution manifold includes first and second independent distribution channels. The vessels in the first set are connected to the first distribution channel. The vessels in the second set are connected to the second distribution channel.

A multi-way input valve is interposed between the fluid supply means and the input manifold. A pressure relief valve is connected to the input manifold, as well.

In accordance with another aspect of the present invention, a tool is provided for use in combination with apparatus for performing parallel chemical reactions under pressure in first and second reaction vessels. The apparatus includes fluid supply means and fluid distribution means operably connecting the fluid supply means and the first and second reaction vessels. The fluid distribution means includes a surface and a fluid channel having an internally threaded portion proximate to the surface. A nozzle with an externally threaded hollow cylindrical portion is adapted to be rotatably received within the channel portion. The nozzle also has a hollow head portion with a shoulder. An o-ring is received around the cylindrical portion, between the surface and the shoulder, when the threaded nozzle portion is received within the channel portion. The tool has a rotatable handle and means, attached to the handle, for engaging the nozzle head until the nozzle is rotated to a position wherein the shoulder is spaced from the surface a predetermined distance, such that the o-ring is compressed to the desired degree.

The nozzle head has a surface with a groove. The head engaging means is a height regulator. It includes grooved means for engaging the grooved nozzle head surface until the shoulder is the predetermined distance from the surface. The grooved head surface is a conical section tapered inwardly from the shoulder towards the end of the head. The head engaging means includes a hollow cylindrical part adapted to receive the head.

The handle preferably has a hexagonally shaped stem. The head engaging means includes a hexagonally shaped opening adapted to receive the stem.

The head engaging means is a height regulator.

The head engaging means includes a hollow, generally cylindrical part adapted to receive the head. That part includes an internally grooved surface.

To these and to such other objects which may hereinafter appear, the present invention relates to a high pressure chemistry reactor as described in detail in the following specification and recited in the annexed claims, taken together with the accompanying drawings, wherein like numerals refer to like parts, and in which:

Figure 1:
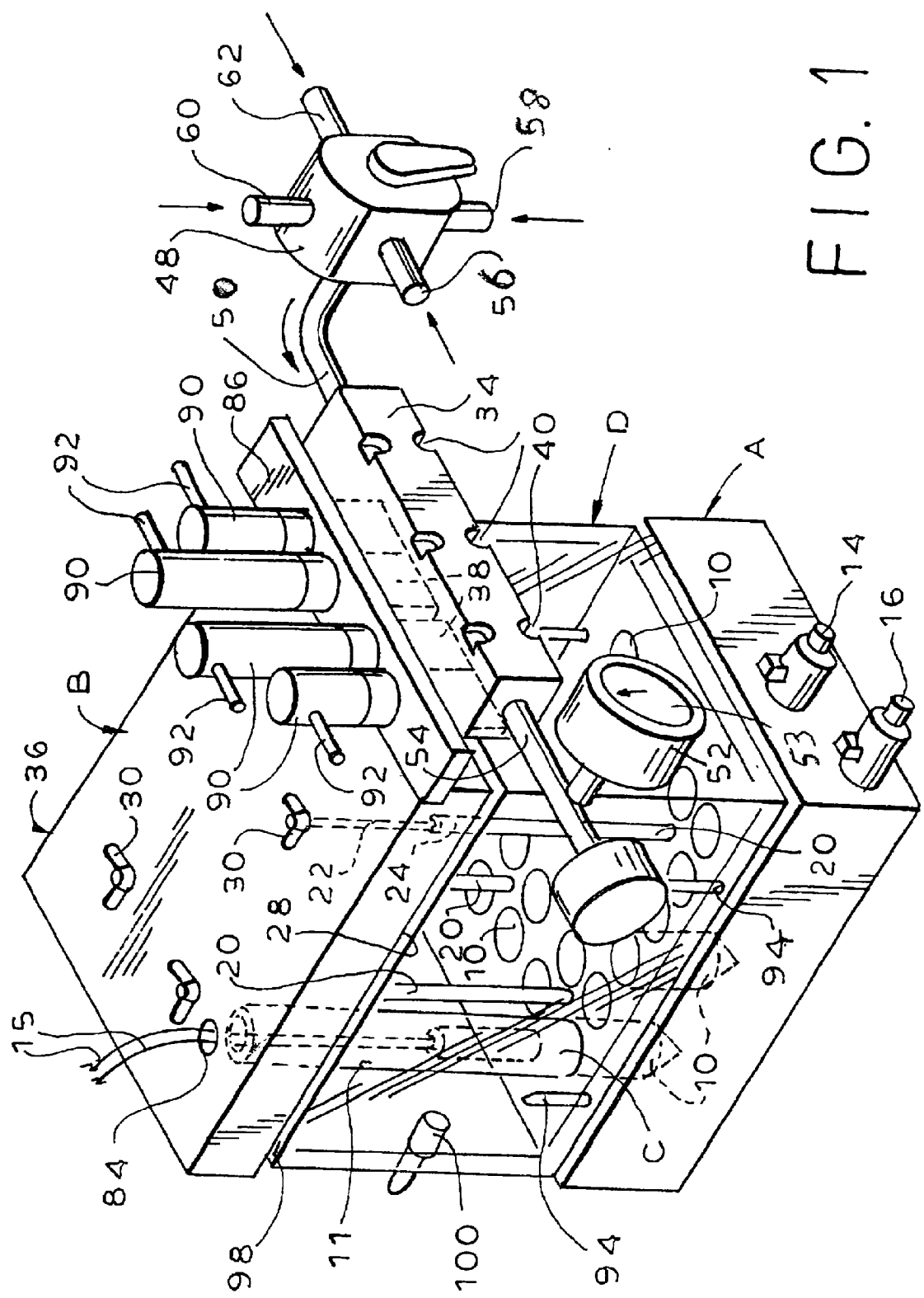
FIG. 1 is an isometric view of the reactor of the present invention.
Figure 2:
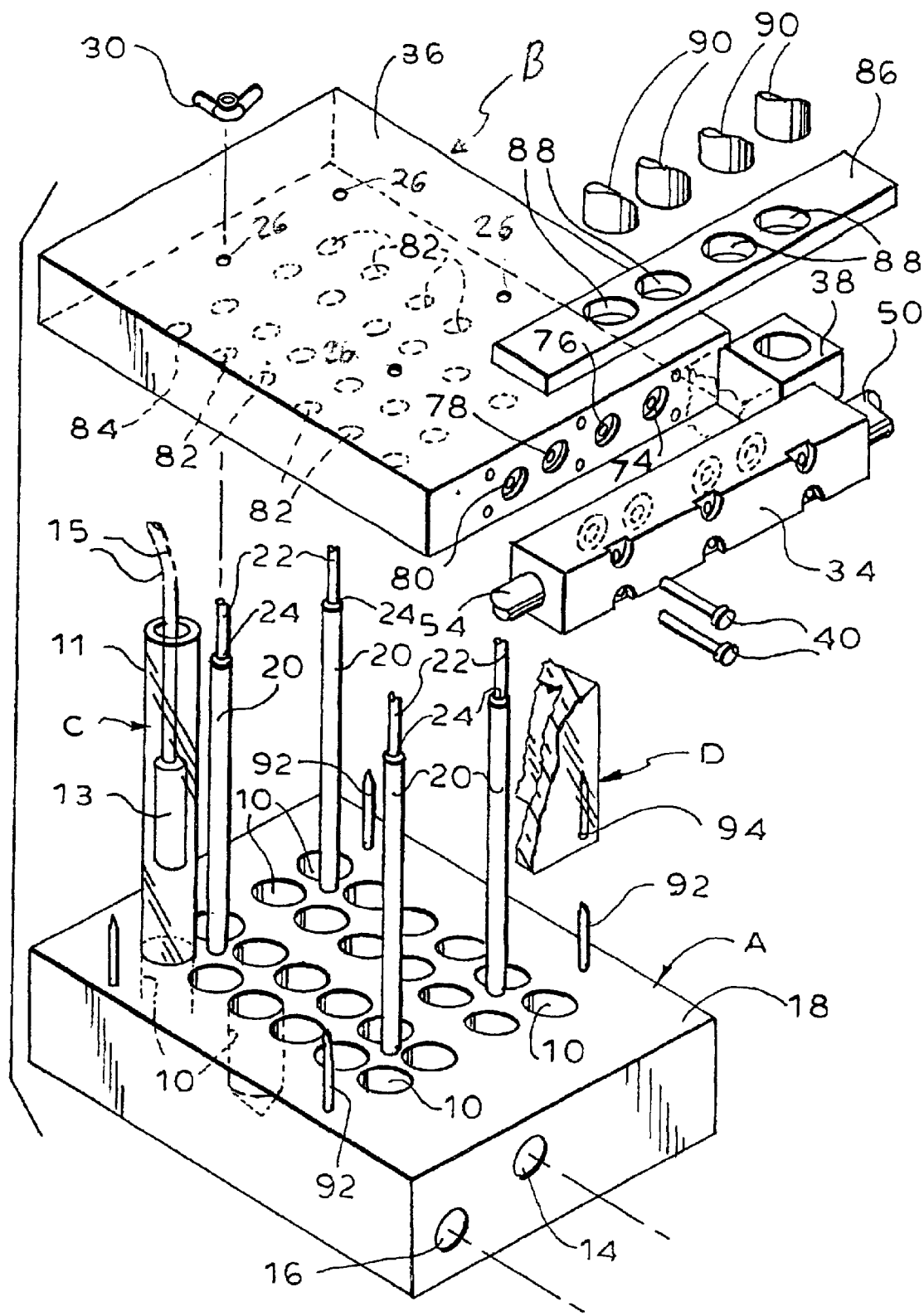
FIG. 2 is an exploded isometric view of the reactor of FIG. 1.

As best seen in FIGS. 1 and 2, the reactor of the present invention includes a temperature control base, generally designated A, and a fluid manifold, generally designated B, between which an array of glass reaction vessels or vials C are situated. Surrounding vessels C, interposed between base A and manifold B, is a box-like transparent explosion proof shield, generally designated D.

Base A is composed of heat conductive material such as anodized aluminum and is provided in the preferred embodiment with an array of 24 vessel receiving recesses 10 arranged in four rows of six recesses each. One glass vessel or vial C is received in each recess 10. Preferably, the bottoms of recesses 10 are conical or semicircular to maximize the surface contact between the recess wall and the vessel wall as so to maximize heat transfer. This recess configuration also distributes the load uniformly allowing each vessel to carry more weight and functions to self-center the vessel.

Base A has a network of internal fluid flow channels 12 which connect a fluid input port 14 and a fluid output port 16. Each port 14, 16 is preferably provided with a standard "quick connect" connector. Channels 12 are situated such that fluid flowing into port 14 passes through the base, adjacent the recesses 10 and hence the bottoms of vessels C, and exits at outport 16. By heating and/or cooling the fluid, the temperature of base A and thus of the bottoms of vessels C, can be controlled.

Preferably, one of the glass vessels 11 is adapted to receive a conventional thermo-couple 13, instead of reaction constituents. The output signal from the thermo-couple, which appears on leads 15, is used as a feedback to the apparatus which controls the temperature of the fluid flowing in channel 12 of base A to increase the accuracy of the temperature control system.

Extending upwardly from the top surface 18 of base A are four stand-offs 20 which serve to align and space the components of the reactor. Each stand-off 20 has a top portion 22 has an externally threaded tip. Portion 22 has a reduced diameter as compared to the lower portion, of the stand-off defining a shoulder 24. Manifold B is mounted above base A on stand-offs 20. Manifold B has four openings 26 which receive top portions 22 of stand-offs 20 such that the lower surface 28 of the manifold rests on shoulders 24. Manifold B is secured to the base by internally threaded wing-nuts 30 which are received on the threaded tips of portions 22.

The height of stand-offs 20, from top surface 18 of base A to shoulders 24, determines the distance between base A and bottom surface 28 of manifold B. That distance is selected such that the rims of the vessels C seated in recesses 10 will cooperate with o-rings 32, affixed to the bottom surface 28 of the manifold by nozzles 33, as explained in detail blow. The o-rings 32 form a pressure seal with the rims of vessels C when wing-nuts 30 are tightened.

Manifold B is formed of two portions, a front or input portion 34 and a rear or distribution portion 36, both made of anodized aluminum. Manifold portions 34, 36 are spaced apart by a distance equal to the depth of a set of four valve bodies 38, one for each row of vessels C. Six screws 40 hold the manifold portions 34, 36 and valve bodies 38 together.

Figure 4:
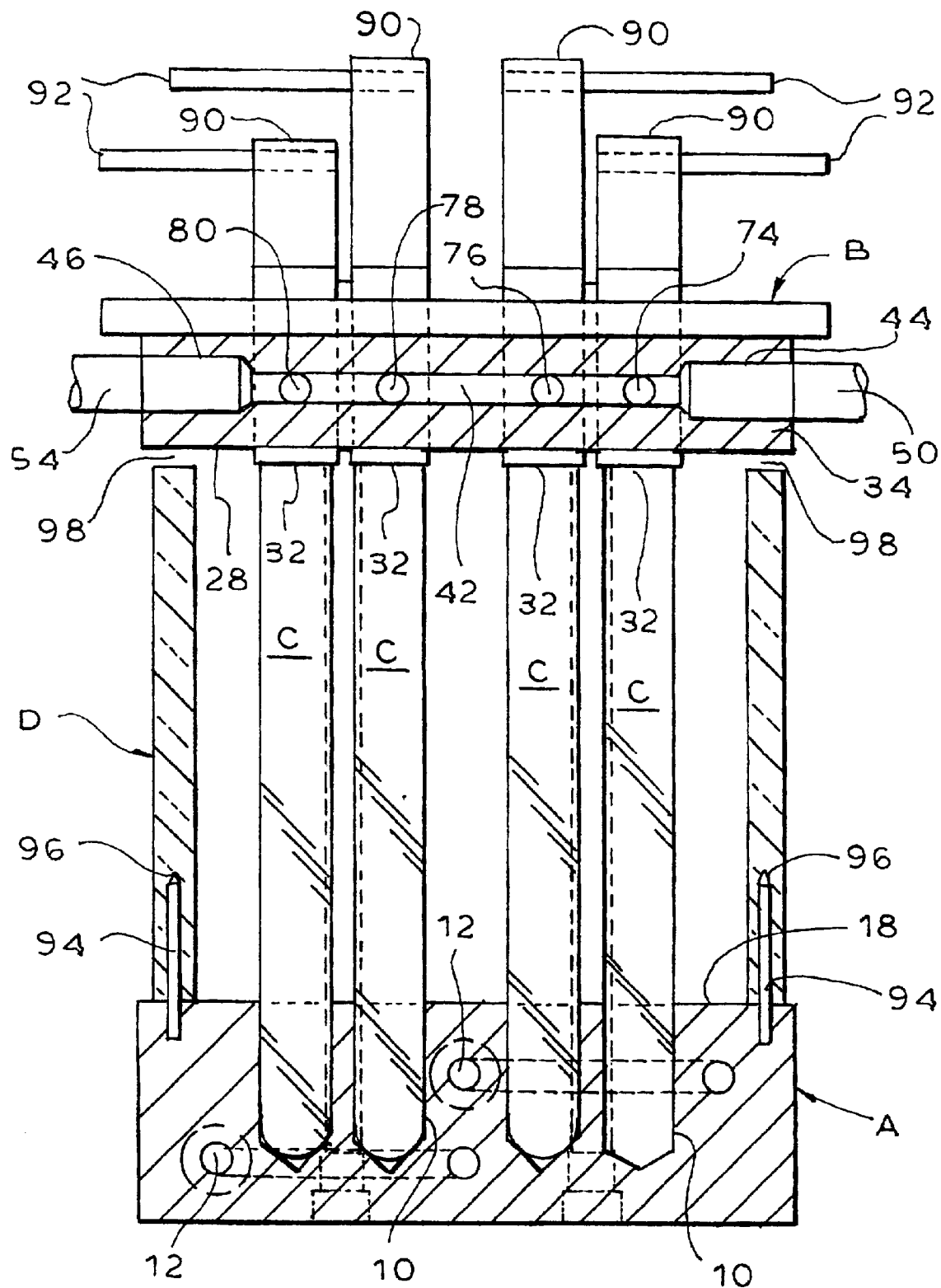
FIG. 4 is a cross-sectional view of the reactor taken along line 4—4 of FIG. 3.
Figure 5:
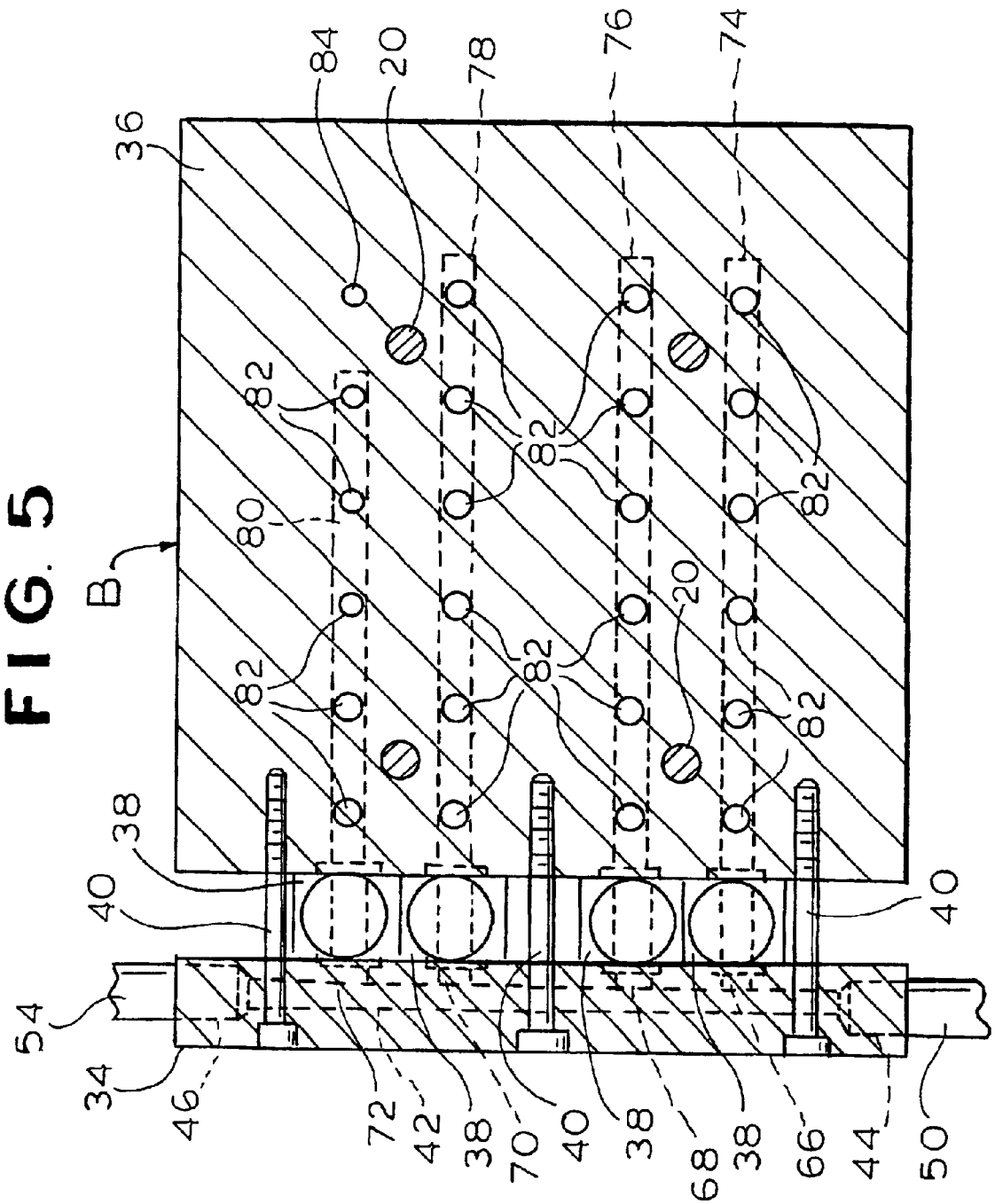
FIG. 5 is a cross-sectional view of the reactor taken along line 5—5 of FIG. 3.
Figure 6:
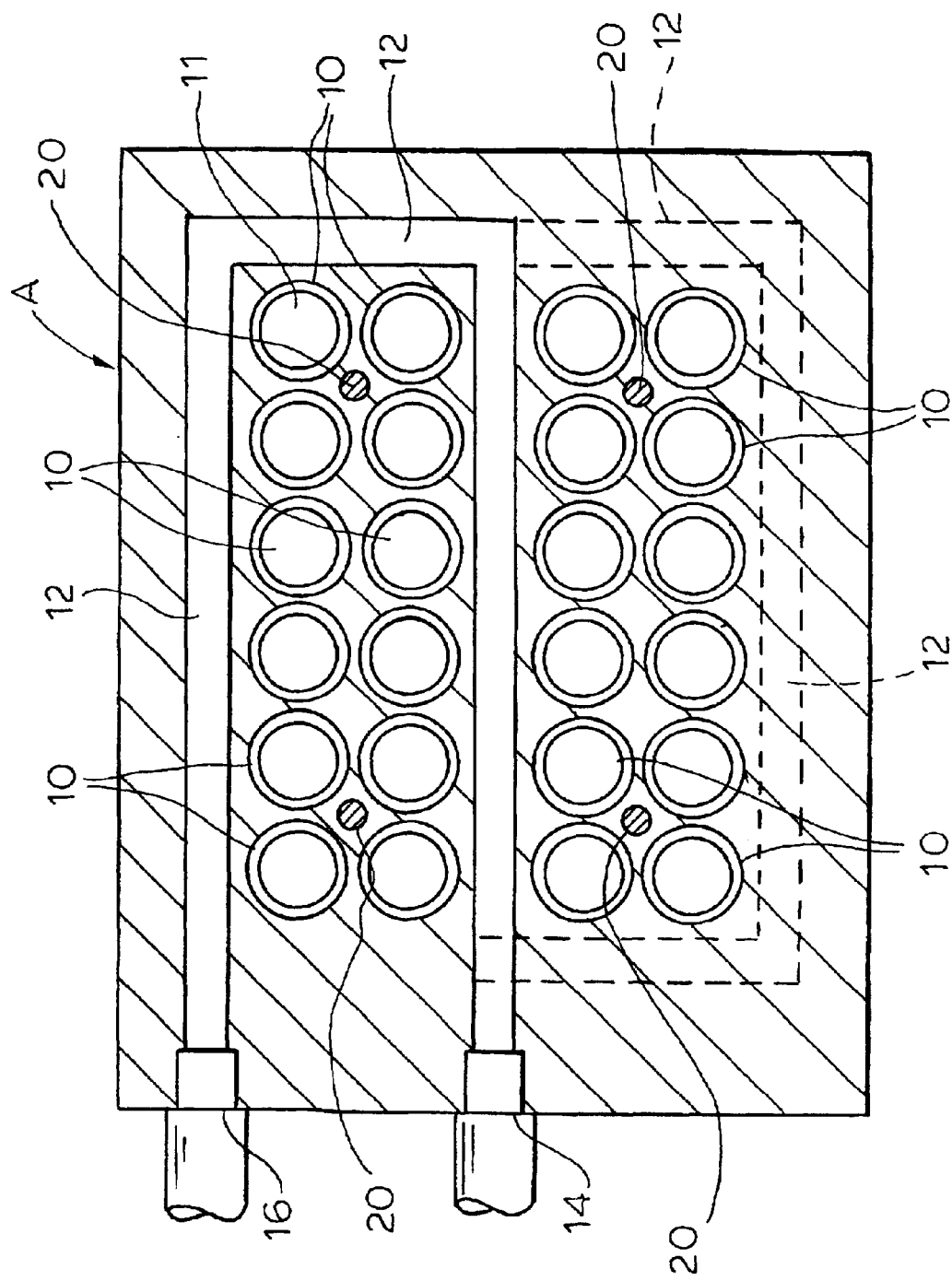
FIG. 6 is a cross-sectional view taken along line 6—6 of FIG. 3.

As best seen in FIGS. 4 and 5, front manifold portion 34 has an internal channel 42 which extends from one side to the other side. Proximate each side of the manifold portion 34, the channel has an increased diameter section 44, 46. A Multiple-way input valve 48 (FIG. 1) is provided with a rearwardly extending "L" shaped connecting stem 50 which is received in channel section 44. A pressure relief valve 52 (FIG. 1) is provided with a "T" shaped stem 54 that is received in channel section 46.

Valve 48, as seen in FIG. 1, has four ports 56, 58, 60 and 62 which can be connected to four different fluid supplies, such as tanks of air, carbon monoxide, syn-gas (mixture of hydrogen and carbon monoxide), hydrogen, nitrogen, a vacuum source or the like. In this context, the word "supply" should be construed to include an exhaust, such as a vacuum source, as well as a fluid supply tank. Valve 48 permits manifold B to be connected to any of the four sources, without the necessity of disconnecting and reconnecting after each change.

Valve 52 is a conventional pressure relief valve equipped with an analog readout 53 attached to it to form an assembly. Valve 52 functions to prevent over pressurization of the manifold and hence of the reaction vessels.

Channel 42 in manifold portion 34 has four spaced, rearwardly extending sections 66, 68, 70 and 72. Each of these channel sections leads to the input side of a different one of the valve bodies 38. The rear or output sides of each of the valve bodies 38 are each connected to a different one of four internal distribution channels 74, 76, 78, 80 in manifold portion 36. Each distribution channel has a plurality of downwardly directed openings 82 which align with the mouths of the vessels C located below the manifold. Six openings 82 are located in each of the distribution channels 74, 76 and 78. Channel 80 has only five openings 82. The sixth vessel in that row is the vessel 11 which receives thermo-couple 13 and hence requires no fluid input. However, an opening 84 is present in the manifold to permit the leads 15 from thermo-couple 13 to extend through the manifold.

Above the manifold portions, over valve bodies 38, is a valve guide 86. Valve guide 86 is also made of anodized aluminum and is provided with four circular openings 88, each aligned with a different one of the valve bodies 38. Four upstanding cylindrical valve stems 90 are provided, one for each valve body 38. The stems 90 extend through openings 88 and above guide 86. Each stem has a different height so as not to interfere with the other stems. A handle 92 extends perpendicular to the axis of each stem 90 to facilitate accurate positioning of the stem as it is rotated about its axis to open and close the associated valve.

Each valve body 38 independently controls the fluid flow to one distribution channel and hence one row of reaction vessels. Thus, one or more rows of vessels can be independently selected for use, as needed.

Four upstanding pins 94 are situated on top surface 18 of base A. The wall of explosion proof shield D, which is made of transparent plastic material of sufficient strength to withstand the force of a burst vessel, has four recesses 96, two along each opposite side. These recesses are adapted to receive pins 94, so as to properly align shield D on the reactor.

The walls of shield D are slightly shorter than the distance between top surface 18 of base A and lower surface 28 of manifold portion 36 so as to leave a small gap between the top surface 98 of the shield wall and surface 28. This gap is small enough so as to prevent glass pieces from a burst vessel from exiting the shield but large enough to permit gas within the shield to freely exit. This gap is important because in certain situations it is necessary to flood the interior of the shield with an inert gas so as to create an inert atmosphere surrounding the reaction vessels. The inert gas is introduced into shield D through a port 100 (FIG. 1) having a"quick connect" connector similar to those used on ports 14 and 16 of base A.

Figure 7:
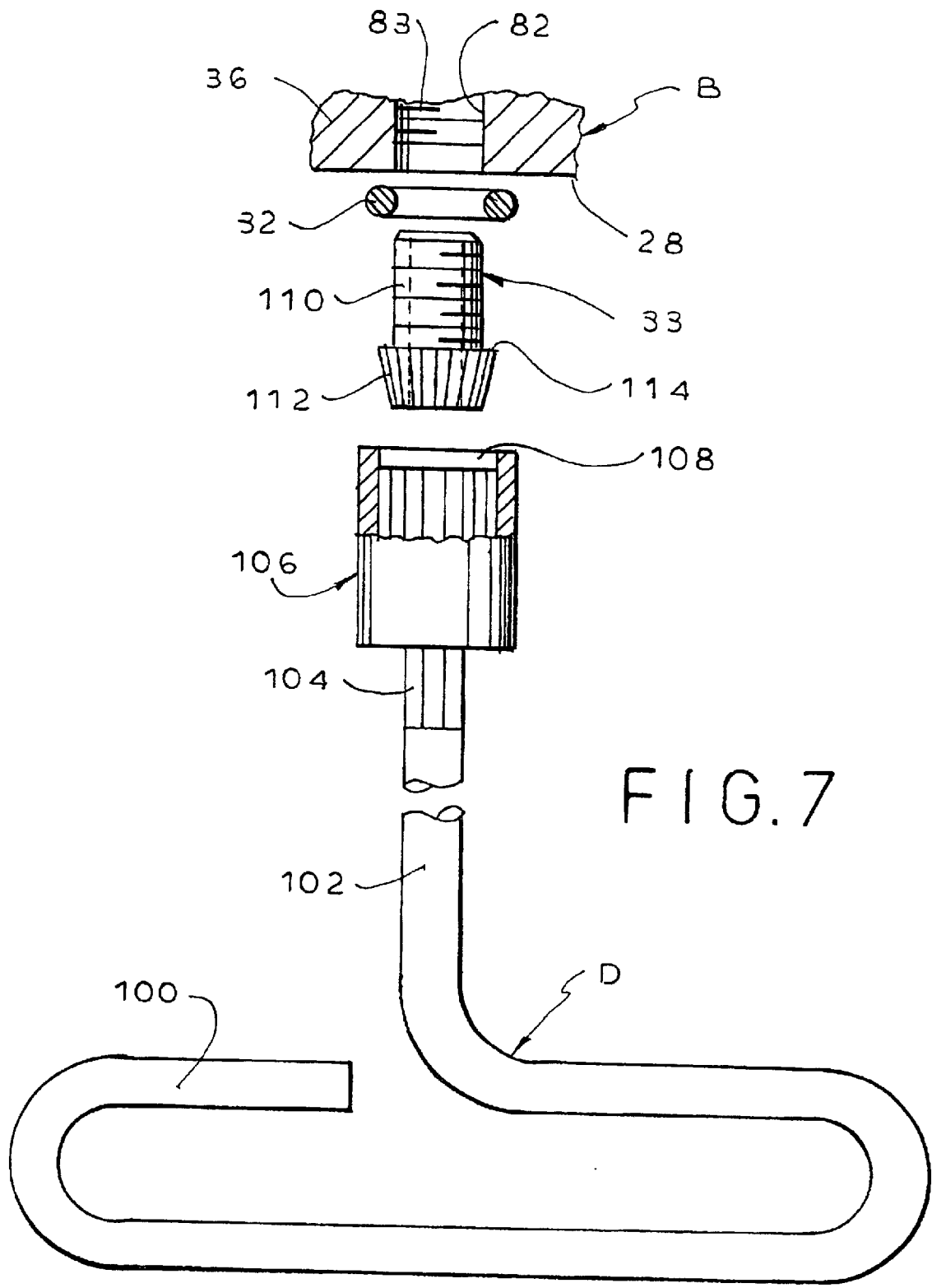
FIG. 7 is an exploded elevational view showing the nozzle, the o-ring used to seal the reaction vessels and a partial cut-away view of the tool for mounting same.
Figure 9:
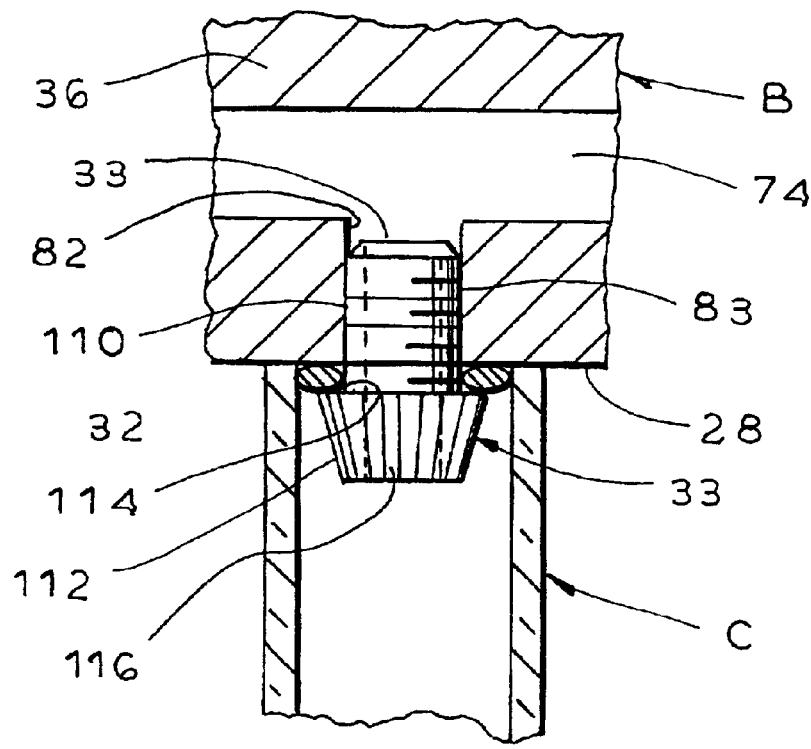
FIG. 9 is a cross-sectional view of a sealed vessel.

FIG. 7 illustrates one of the vessel sealing means. It includes a nozzle 33 that holds o-ring 32 to the bottom surface 28 of distribution manifold B. Nozzle 33 maintains the o-ring 32 at the proper compression such that it seals the mouth of vessel C, as seen in FIG. 9.

In order for the o-ring 32 to be compressed to the proper extent, a tool, generally designated D, is employed. Tool D, as seen in FIG. 7, is in the shape of a key with a handle 100, a stem 102 and a height regulator 106. A portion 104 of stem 102 has a hexongonal cross-section. Portion 104 frictionally engages a hexagonal opening (not shown) in height regulator 106.

Height regulator 106 is a hollow, generally cylindrical part which has internal, axially extending grooves along its length, except for a blank portion 108 near its forward end.

Channel 82 in manifold B has an internally threaded portion 83 proximate surface 28 of manifold B. Nozzle 33 has a hollow, generally cylindrical, externally threaded portion 110 adapted to be received within channel 82. Nozzle 33 also has a head 112 in the shape of a conical section. Head 112 has a shoulder 114 which has a diameter greater than the diameter of portion 110 and an externally grooved surface 116.

Figure 8:
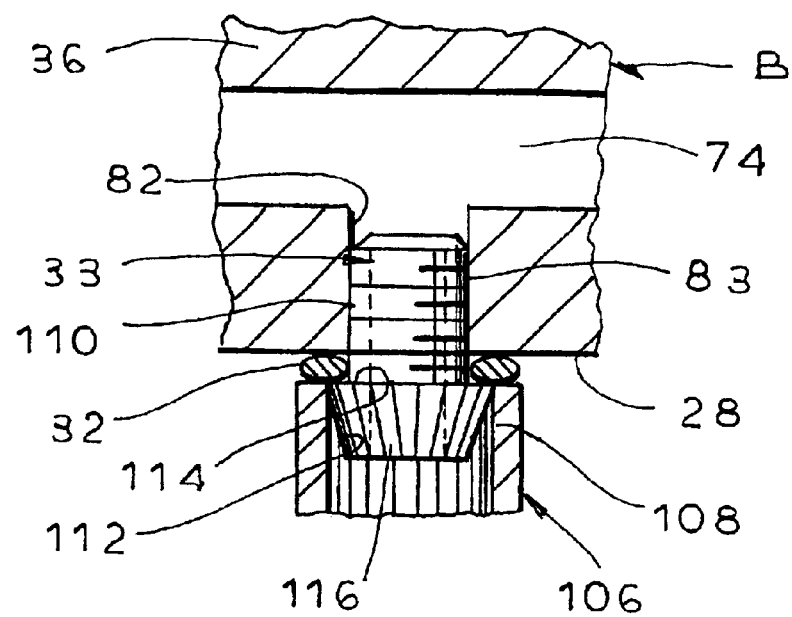
FIG. 8 is a cross-sectional view of a mounted nozzle.

O-ring 32 is situated around portion 110 of nozzle 33, between surface 28 and shoulder 114. Portion 110 of nozzle 33 is received in channel 82. Height regulator 106 is placed over nozzle 33 and handle 100 is rotated. The internal grooves in regulator 106 engage the grooves of head surface 116 and nozzle 33 rotates as the tool is rotated. As nozzle 33 rotates, it advances towards surface 28 until the grooves on surface 116 reach blank portion 108 and are no longer engaged, as seen in FIG. 8. No amount of additional rotation of the tool will tighten the nozzle further.

In this position, shoulder 114 is a pre-determined distance from surface 28 such that o-ring 32 is compressed to the desired extent. As shown in FIG. 9, the o-ring will seal the mouth of vessel C when the vessel is received between the base A and manifold B.

Figure 3:
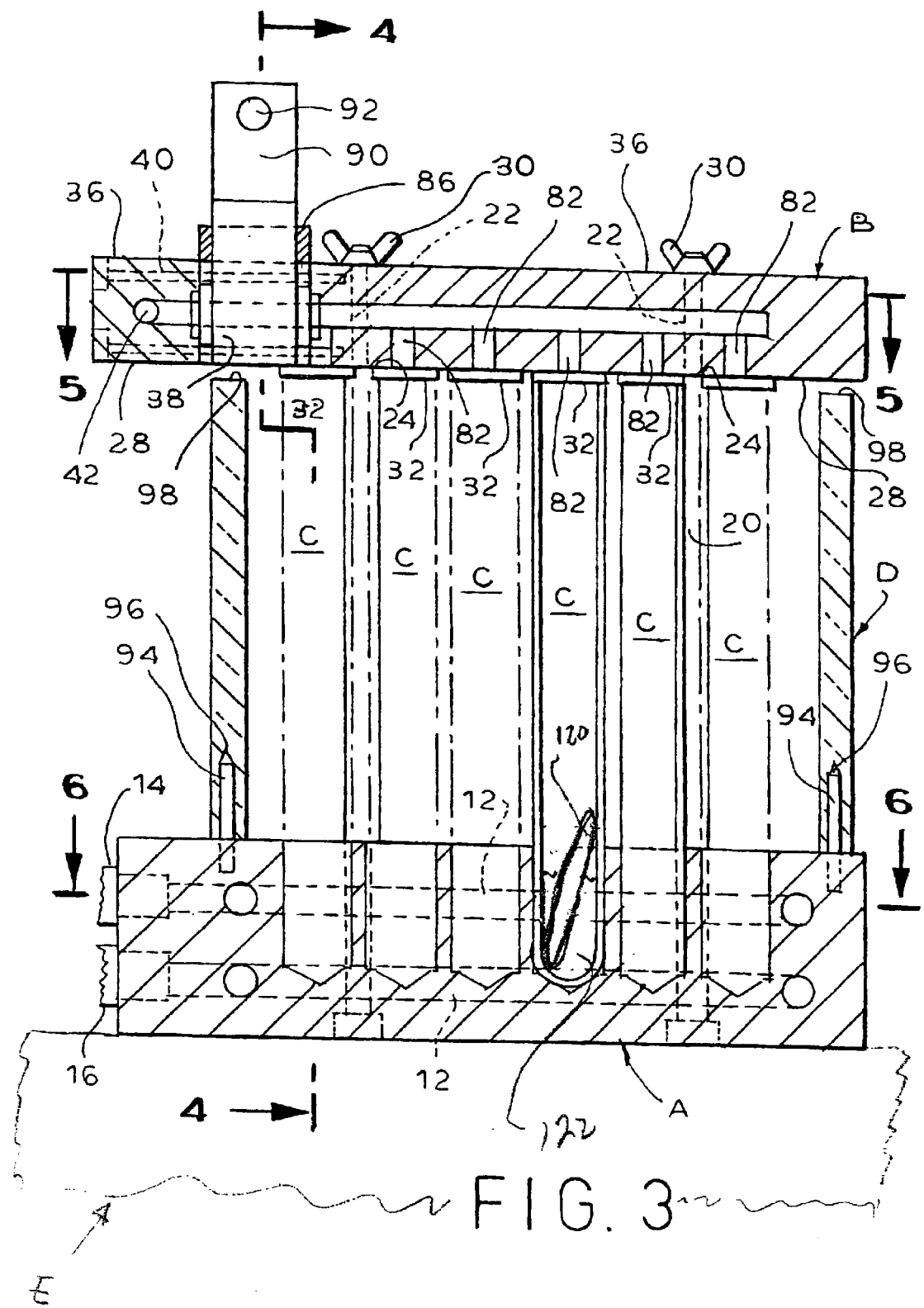
FIG. 3 is a side cross-sectional view of the reactor of FIG. 1.

The reactor can be used with a magnetic stirrer, generally designated E, as shown in FIG. 3. Magnetic stirrer E can be of conventional design or be an air driven magnetic stirrer such as disclosed in copending application Ser. No. 10/057, 459 filed Jan. 25, 2002 and entitled "Parallel Chemistry Reactor With Interchangeable Vessel Carrying Inserts." When so used, the reactor is placed on top of the stirrer E and a magnetic stir bar 120, one of which is illustrated in FIG. 3, is situated in each of the vessels C containing liquid reaction mixture 122 to be stirred.

Stir bar 120 is fabricated to be longer than the diameter of the vessel C such that its rests at an angle relative to the bottom of the vessel and extends through the surface of liquid 122. This improves the amount of contact between the reaction mixture, the high pressure gas and the catalyst.

It will now be appreciated that the present invention relates to a parallel chemistry reactor useful for performing multiple reactions under pressure wherein cross-contamination of the reactions is minimized and fluid introduction to different rows of reaction vessels are independently controlled. A multiple-way input valve facilitates introduction of fluids from multiple sources and exhausting of the reaction vessels. A two-part manifold is employed with separate valves interposed between input and distribution portions. A transparent explosion proof shield may be situated around the reaction vessels. A tool with a height regulator is employed to insure that the o-rings are compressed to the desired extent to seal the reaction vessels.

While only a single preferred embodiment of the present invention has been disclosed for purposes of illustration, it is obvious that many modifications and variations could be made thereto. It is intended to cover all of these variations and modifications which fall within the scope of the present invention, as defined by the following claims:

We claim:

1. Apparatus for performing parallel chemical reactions under pressure, said apparatus comprising first and second sets of reaction vessels, at least one of said vessel sets comprising more than one reaction vessel, a first source of a first fluid, a second source of a second fluid, a fluid manifold, said fluid manifold comprising a source selection portion, a fluid distribution portion and a valve portion interposed between said source selection portion and said fluid distribution portion, said source selection portion comprising means for selecting one of said fluid sources and for connecting said selected source to said valve portion, said fluid distribution portion comprising first and second fluid distribution channels, means for separately connecting each of said fluid distribution channels to each of the reaction vessels in a different one of said reaction vessel sets, respectively, said valve portion comprising first and second valve bodies each of which is associated with a different one of said fluid distribution channels in said fluid distribution portion, and means for independently actuating said valve bodies to connect said source selecting means in said source selection portion and said fluid distribution channel in said fluid distribution portion associated with the actuated valve body.

2. The apparatus of claim 1 wherein said first and second sets of reaction vessels comprise first and second rows of reaction vessels, respectively.

3. The apparatus of claim 1 wherein said selecting means comprises a multiple-way fluid control valve.

4. The apparatus of claim 3 wherein said multiple-way fluid control valve comprises a five-way fluid control valve.

5. The apparatus of claim 1 wherein said connecting means further comprises means for separately sealing each of said reaction vessels with said fluid distribution channel.

6. The apparatus of claim 5 wherein said sealing means comprises an o-ring and means for affixing said o-ring to said manifold.

7. The apparatus of claim 1 wherein said source selection portion further comprises a pressure relief valve.

8. The apparatus of claim 1 further comprising an explosion proof shield defining a substantially closed interior space within which said reaction vessels are situated.

9. The apparatus of claim 8 further comprising means for connecting one of said fluid sources and said interior space of said shield.

10. The apparatus of claim 1 wherein said independent actuating means comprises first and second valve stems, respectively and wherein said first and said second valve stems have different heights.

11. The apparatus of claim 1 further comprising temperature sensing means and wherein one of said reaction vessels is adapted to receive said temperature sensing means.

12. Apparatus for performing parallel chemical reactions under pressure, said apparatus comprising an array of reaction vessels, said vessel array comprising first and second rows of reaction vessels, at least one of said vessel rows comprising more than one reaction vessel, a first source of a first fluid, a second source of a second fluid, a fluid manifold, said fluid manifold comprising a source selection portion, a fluid distribution portion and a valve portion interposed between said source selection portion and said fluid distribution portion, said source selection portion comprising means for selecting one of said fluid sources and for connecting said selected source to said valve portion, said fluid distribution portion comprising first and second fluid distribution channels, means for separately connecting each of said fluid distribution channels with each of the reaction vessels in a different one of said rows, respectively, said valve portion comprising first and second valve bodies each of which is associated with a different one of said fluid distribution channels in said fluid distribution portion, and means for independently actuating said valve bodies to connect said source selecting means in said source selection portion and said fluid distribution channel in said fluid distribution portion associated with the actuated valve body.

13. The apparatus of claim 12 wherein said selecting means comprises a multiple-way fluid control valve.

14. The apparatus of claim 13 wherein said multiple-way fluid control valve comprises a five-way fluid control valve.

15. The apparatus of claim 12 wherein said connecting means further comprises means for separately sealing each of said reaction vessels with said fluid distribution channel.

16. The apparatus of claim 15 wherein said sealing means comprises an o-ring and means for affixing said o-ring to said manifold.

17. The apparatus of claim 12 wherein said source selection portion further comprises a pressure relief valve.

18. The apparatus of claim 12 further comprising an explosion proof shield defining a substantially closed interior space within which said reaction vessels are situated.

19. The apparatus of claim 18 further comprising means for connecting one of said fluid sources and said interior space of said shield.

20. The apparatus of claim 12 wherein said independent actuating means comprises first and second valves comprise first and second valve stems, respectively and wherein said first and said second valve stems have different heights.

21. The apparatus of claim 12 further comprising temperature sensing means and wherein one of said reaction vessels is adapted to receive said temperature sensing means.

22. Apparatus for performing parallel chemical reactions under pressure, said apparatus comprising a plurality of sets of reaction vessels, at least one of said vessel sets comprising more than one reaction vessel, a first source of a first fluid, a second source of a second fluid, a fluid manifold, said fluid manifold comprising a first portion, a second portion and an intermediate portion interposed between said first portion and said second portion, said first portion comprising means for selecting one of said fluid sources and for connecting said selected source to said intermediate portion, said second portion comprising a plurality of fluid distribution channels, means for separately connecting each of said fluid distribution channels with each of the reaction vessels in a different one of said reaction vessel sets, respectively, said intermediate portion comprising a plurality of valve bodies, each of said valve bodies being associated with a different one of said fluid distribution channels in said second portion, and means for independently actuating said valve bodies to connect said source selecting means in said first portion and said fluid distribution channel in said second portion associated with the actuated valve body.

23. The apparatus of claim 22 wherein said first and second sets of reaction vessels comprise first and second rows of reaction vessels, respectively.

24. The apparatus of claim 22 wherein said selecting means comprises a multiple-way fluid control valve.

25. The apparatus of claim 24 wherein said multiple-way fluid control valve comprises a five-way fluid control valve.

26. The apparatus of claim 22 wherein said manifold further comprises means for separately sealing each of said reaction vessels.

27. The apparatus of claim 26 wherein said sealing means comprises an o-ring and means for affixing said o-ring to said manifold.

28. The apparatus of claim 22 wherein said first portion further comprises a pressure relief valve.

29. The apparatus of claim 22 further comprising an explosion proof shield defining a substantially closed interior space within which said reaction vessels are situated.

30. The apparatus of claim 29 further comprising means for connecting one of said fluid sources and said interior space of said shield.

31. The apparatus of claim 22 wherein said independent actuating means comprises a valve stem associated with each of said valve bodies, and wherein said valve stems have different heights.

32. The apparatus of claim 22 further comprising temperature sensing means and wherein one of said reaction vessels is adapted to receive said temperature sensing means.

\* \* \* \* \*